United States Patent
Gerding et al.

(10) Patent No.: US 10,337,858 B2
(45) Date of Patent: Jul. 2, 2019

(54) DEVICE FOR DETECTING A SURFACE OF BULK MATERIALS

(71) Applicant: KROHNE Messtechnik GmbH, Duisburg (DE)

(72) Inventors: Michael Gerding, Bochum (DE); Michael Deilmann, Essen (DE); Mattias Linkies, Mülheim (DE); Almir Adrovic, Duisburg (DE); Thomas Convent, Issum (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 323 days.

(21) Appl. No.: 15/477,205

(22) Filed: Apr. 3, 2017

(65) Prior Publication Data
US 2017/0284796 A1    Oct. 5, 2017

(30) Foreign Application Priority Data

Apr. 3, 2016    (DE) .................... 10 2016 106 051

(51) Int. Cl.
*G01S 7/02* (2006.01)
*G01S 7/40* (2006.01)
(Continued)

(52) U.S. Cl.
CPC .......... *G01B 15/00* (2013.01); *G01F 23/284* (2013.01); *G01S 7/4008* (2013.01); *G01S 7/4026* (2013.01);
(Continued)

(58) Field of Classification Search
CPC .... G01F 23/284; G01F 23/0076; G01F 23/00; G01F 23/2962; G01F 25/0061;
(Continued)

(56) References Cited

U.S. PATENT DOCUMENTS 9,382,984 B2 *   7/2016   Baer .................. G01F 23/0061
9,684,061 B2 *   6/2017   Bilgic ....................... G01S 7/02
(Continued)

FOREIGN PATENT DOCUMENTS

CN       201430212 Y      3/2010
WO     2012/131143 A1    10/2012

*Primary Examiner* — Olumide Ajibade Akonai
(74) *Attorney, Agent, or Firm* — David S. Safran; Roberts Mlotkowski Safran Cole & Calderon, P.C.

(57) ABSTRACT

Described is a device for detecting a surface of bulk materials, the device including: a transmitter unit having a radiation direction for transmitting a measuring signal, a receiver unit for receiving a measuring signal reflected on the surface of the bulk material, a control and evaluation unit for controlling the alignment of the radiation direction and for evaluating the received measuring signal, and an alignment arrangement for aligning the transmitter unit. The alignment arrangement includes at least one connecting element for connection to the transmitter unit, at least one bearing element, and at least one positioning member. The connecting element is pivotably connected to the bearing element via the positioning member. The alignment of the transmitter unit can be changed by the positioning member. The positioning member includes a shape memory element that actively changes its shape under variations of an influencing parameter.

14 Claims, 3 Drawing Sheets

(51) Int. Cl.
*H01Q 1/22* (2006.01)
*G01B 15/00* (2006.01)
*G01F 23/00* (2006.01)
*G01F 23/284* (2006.01)
*G01F 25/00* (2006.01)

(52) U.S. Cl.
CPC .......... *G01F 23/00* (2013.01); *G01F 23/0076* (2013.01); *G01F 25/0061* (2013.01); *G01S 2007/027* (2013.01); *H01Q 1/225* (2013.01)

(58) Field of Classification Search
CPC .... G01F 25/0084; G01F 17/00; G01F 23/003; G01S 13/88; G01S 13/87; G01S 2007/027; B65D 90/48; G01B 11/14; G01B 7/02; G01B 7/30; G01B 11/24
See application file for complete search history.

(56) References Cited

U.S. PATENT DOCUMENTS

| | | | |
|---|---|---|---|
| 2006/0201245 A1* | 9/2006 | Huber | G01F 23/003 73/290 R |
| 2009/0161105 A1* | 6/2009 | Chen | G01F 23/284 356/369 |
| 2011/0083504 A1* | 4/2011 | Unger | G01C 9/20 73/304 C |
| 2013/0269414 A1* | 10/2013 | Ferraro | G01F 23/284 73/1.73 |
| 2016/0054167 A1 | 2/2016 | Welle et al. | |

* cited by examiner

DEVICE FOR DETECTING A SURFACE OF BULK MATERIALS

BACKGROUND OF THE INVENTION

Field of the Invention

The present invention relates to a device for detecting a surface of bulk materials comprising a transmitter unit having a radiation direction for transmitting a measuring signal, a receiver unit for receiving a measuring signal reflected on the surface of the bulk material, a control and evaluation unit for controlling the alignment of the radiation direction and for evaluating the received measuring signal, and an alignment arrangement for aligning the transmitter unit, wherein the alignment arrangement has at least one connecting element for connection to the transmitter unit, at least one bearing element and at least one positioning member.

Description of Related Art

The detection of the surface of bulk materials, for example for fill level measurement in a container, is normally carried out using transit time measurement of radar or ultrasound signals. Thereby, the measuring signal is emitted by a transmitter unit in the direction of the bulk material and then, after the signal is reflected at the surface, is received by a receiving unit. The distance of the transmitter unit from the surface of the bulk material and, from this, the fill level of the bulk material in the container can be determined from the transit time of the received signal by means of an evaluation unit.

Alternatively, it is also known that the transmitter unit emits a frequency modulated radar signal as a measuring signal, which is reflected on the surface to be measured and then received by the receiver unit. For evaluation, the difference frequency of the transmitted and the received measuring signal is formed, which is proportional to the distance to the surface of the bulk material. The fill level is then determined from the distance to the surface of bulk material.

What can cause a problem in the above-described method for detecting the surface of a bulk material is that, in each case, only one measuring point of the surface is monitored. However, especially when dealing with bulk materials, irregularities are often formed, in particular material cones on stockpiles, bunkerings or silos. These material cones, however, are not registered by the above-described method, which leads to an inaccurate result of the measurement of the fill level. Thus, it is not possible to determine existing irregularities in the surface structure of bulk materials using the above-described method.

In order to solve this problem, EP 2 803 952 A1, which corresponds to U.S. Patent Application Publication 2016/0054167 A1, suggests providing a positioning device through which the main radiation direction of the transmitter unit can be changed, so that a series of echo curves can be generated under different main directions of radiation. For this, a mechanically or electronically pivotable transmitter unit is provided in the form of an antenna. The alignment of the transmitter unit is either changed mechanically or with the help of a correspondingly controlled antenna array. In this manner, it is possible to sample the surface of a bulk material both two-dimensionally as well as three-dimensionally.

The above-described device, however, has the disadvantage that the movable elements are subject to greater wear and require maintenance. Additionally, complex mechanical arrangements, in particular when used for detecting surfaces of bulk materials, are vulnerable to contamination and vibrations.

SUMMARY OF THE INVENTION

In light of the disadvantages of conventional techniques, the object of the invention is to provide a device for two-dimensional or three-dimensional detection of the surface of a bulk material, whose construction is particularly simple and economical, and furthermore, is particularly robust and has a long service life.

The object is achieved by a device as mentioned in the introduction in that the connecting element is pivotably connected to the bearing element via the positioning member, that the alignment of the transmitter unit can be changed by the positioning member, and that the positioning member comprises a shape memory element that actively changes its shape under variations of an influencing parameter.

According to the invention, it has been recognized that the use of complex mechanical components for aligning or controlling the alignment of the transmitter unit can be done without when the characteristic of shape memory elements of active form changing at variations of respective influencing parameters is exploited.

Shape memory elements are characterized in that they actively, reversibly change shape, for example, at a change in temperature or in the magnetic field strength.

This effect is used in the device according to the invention for changing the alignment of the transmitter unit. Consequently, not only one point of the surface of the bulk material is detected, but rather by means of the device according to the invention, a two-dimensional or three-dimensional structure of the surface can be detected. In particular irregularities of the surface, such as material cones can be registered in this manner. Since the change of shape of a shape memory element takes place continuously, the surface of the bulk material detected by the measuring signal can be completely continuously measured. The evaluation unit is preferably designed in such a manner that it generates a surface profile of the measured bulk material.

The device according to the invention thus has the advantage that it is particularly simply and economically designed. Furthermore, maintenance of the positioning member is also not necessary or only with little effort.

According to a first design, the shape memory element has a shape memory alloy, in particular a Ni/Ti alloy or a Ni/Ti/Cu alloy or a Cu/Zn/Al alloy or a Cu/Al/Ni alloy. Shape memory alloys actively change their shape in dependence on external influencing factors, such as a change in temperature or in magnetic field strength. In thermal shape memory elements, thermal shape memory alloys have a martensite structure, when the temperature increases, the lattice structure of the alloy changes to a austenite structure. Simultaneously, with a temperature increase, the shape memory element actively changes its shape. The shape memory element "remembers" the shape in the presence of the austenite structure and actively returns back to this shape. In magnetic shape memory alloys, the application of an external magnetic field leads to a shift of twin boundaries between two martensite structures, which also generates a macroscopic change in shape. Based on this behavior, shape memory alloys are particularly suitable for use as active positioning members.

Shape memory alloys are also suitable as positioning members for aligning the transmitter unit since they have only a low sign of fatigue and, in this respect, provide a particularly long service life even at high loads.

According to a preferred design, the shape memory element, according to the two way effect, has two shapes that it actively takes in the case of a variation of an influencing parameter. This design has the advantage that solely the variation of one influencing parameter affects both the deflection of the transmitter unit out of the base position as well as back into the base position. Further external forces are not necessary for setting the alignment of the transmitter unit.

According to an alternative design, the shape memory element, according to the one way effect, has a base shape that it actively takes in the case of a variation of an influencing parameter and that a deflecting element is provided that is designed and arranged so that it deflects the shape memory element out of the base shape by exerting a force. For example, the deflecting element can be the transmitter unit in conjunction with the connecting element. It is possible that the transmitter unit deflects the shape memory element out of the base shape using the force of weight and the shape memory element actively changes the alignment of the transmitter unit using a change in temperature.

The device according to the invention can be improved in that a movable retaining element is arranged between the connecting element and the bearing element. Thereby, the retaining element is preferably designed and arranged in such a manner that it increases the stability of the alignment arrangement. It is particularly preferred that cables for the electric contact of the transmitter unit run through the retaining element.

It is also preferred when the alignment arrangement has at least three positioning members, wherein at least one positioning member has a shape memory element and it is preferred when the at least three positioning members are arranged in such a manner that the alignment of the transmitter unit can be deflected in all three spatial directions. According to this design, the connecting element is pivotably connected to the bearing element via at least three positioning members. Thus, this design has the advantage that a particularly large area of the surface of the bulk material can be monitored. It is particularly preferred that at least three positioning members have form memory elements.

The device according to the invention can be further improved in that at least one positioning member is designed in the form of a pressure/tension rod or in the form of a taut wire. In this design, the change in shape at a variation of the influencing parameter consists of a compression or expansion of the pressure/tension rod or in an expansion of the taut wire. Such a change in shape causes a change in the radiation direction of the transmitter unit.

It is of particular advantage when the influencing parameter for changing the shape of the shape memory element is the temperature or the magnetic field strength of the shape memory element.

If the influencing parameter for changing the shape of the shape memory element is the temperature, it is preferred when the shape memory element is applied with a current by the control and evaluation unit for changing the temperature. A change in temperature of the shape memory element can be particularly easily achieved in this manner.

According to a further design of the device according to the invention, the alignment arrangement has at least three positioning members, wherein the at least three positioning members each have a shape memory element and wherein the influencing parameter for changing the shape of each shape memory element can be independently varied. Preferably, the shape memory elements can be applied with current independently of one another, whereby their temperature can be independently varied. The alignment of the radiation direction of the transmitter unit can be carried out flexibly in this manner.

Alternatively, the device according to the invention can have at least three positioning members, wherein the at least three positioning members each have a shape memory element, wherein the influencing parameter for changing the shape of each shape memory element can be varied in dependence on the influencing parameter for changing the shape of at least one of the other shape memory elements. For example a fixed route can be provided, that is sampled or monitored by the transmitter unit according to this design. In this respect, a systematic monitoring of the surface of bulk materials can be carried out.

Preferably, the retaining element has a joint, in particular a ball and socket joint. According to this design, the transmitter unit can be particularly flexibly deflected in every direction.

According to a further advantageous design, the connecting element and/or the bearing element is/are formed to have a plate shape. This design has the advantage that the mounting of the positioning member or the positioning members can be particularly flexibly carried out.

In detail, there is a plurality of possibilities for designing the device for detecting a surface of a bulk material according to the invention as will be apparent from the following description of preferred embodiments in conjunction with the accompanying drawings.

DETAILED DESCRIPTION OF THE INVENTION

Figure 1:
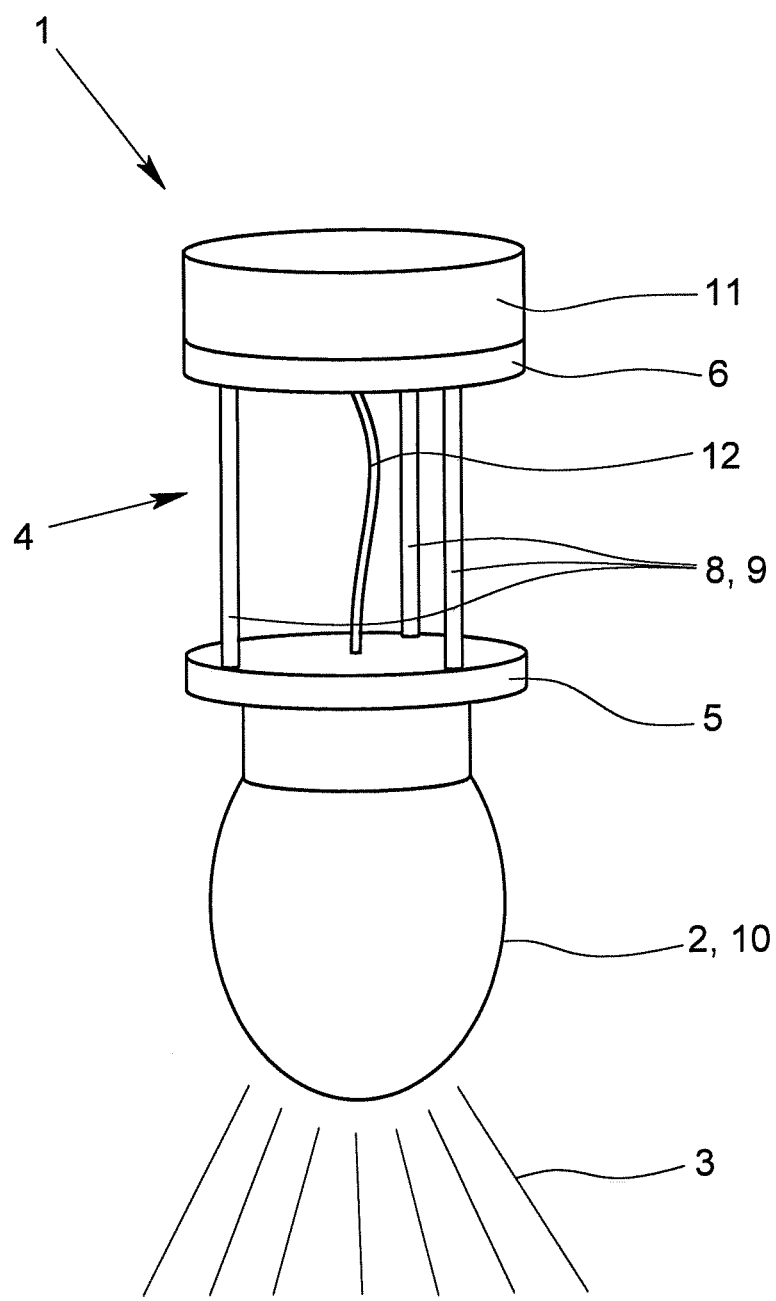
FIG. 1 is a first embodiment of a device according to the invention in the base shape.

A first embodiment of a device 1 for detecting a surface of a bulk material is shown in FIG. 1. The device 1 comprises a transmitter unit 2 having a radiation direction for emitting a measuring signal 3, wherein the transmitter unit 2 simultaneously represents the receiver unit 10, and an alignment arrangement 4 for aligning the transmitter unit 2. A control and evaluation unit 11 is provided for controlling the alignment of the radiation direction or the transmitter unit 2 and for evaluating the received measuring signal reflected at the surface of the bulk material. The alignment arrangement 4 comprises a plate-shaped connecting element 5 for connection to the transmitter unit 2 and a bearing element 6, which is also designed with a plate shape and which is presently connected to the control and evaluation unit 11. Additionally, the alignment arrangement 4 has three positioning members 8, which each have a shape memory element 9, that change their shape at a change in temperature. Presently, the positioning members 8 are designed in the form of pressure/tension rods. Furthermore, an electric connection 12 is provided that connects the control and evaluation unit 11 to the transmitter unit 2.

The connecting element 5 is pivotably connected to the bearing element 6 via the positioning members 8. The alignment of the transmitter unit 2 can be changed by the positioning members 8, in particular by changing the shape of the positioning members. For this, the positioning members 8 can be individually applied with current, i.e., independent of one another, by the control and evaluation unit, which leads to a change in temperature of the positioning members and, thereby, the shape memory elements. The illustrated embodiment makes a deflection of the transmitter unit 2 in every direction possible, whereby a particularly flexible detection of the surface of bulk materials is possible.

In this respect, the illustrated embodiment of the device 1 according to the invention has the advantage that a robust alignment arrangement for setting the alignment of the transmitter unit 2 is provided by using shape memory elements, the arrangement also simultaneously having a long service life.

Figure 2:
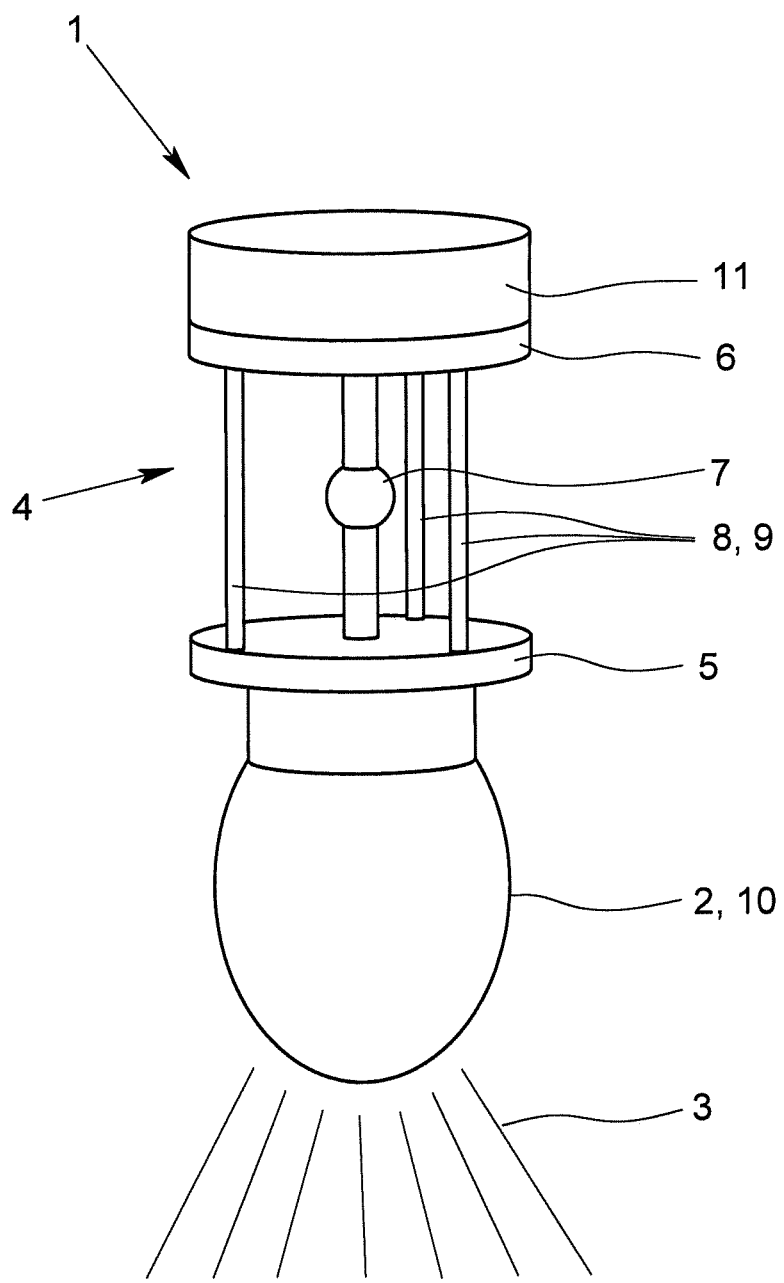
FIG. 2 is a second embodiment of a device according to the invention in the base shape.

A second embodiment of a device 1 according to the invention for detecting a surface of bulk materials is shown in FIG. 2. The device comprises a transmitter unit 2 having a radiation direction for transmitting a measuring signal 3, wherein the transmitter unit 2 simultaneously represents the receiver unit 10, and an alignment arrangement 4 for aligning the transmitter unit 2. A control and evaluation unit 11 is provided for controlling the alignment of the radiation direction or the transmitter unit 2 and for evaluating the received measuring signal reflected at the surface of the bulk material. The alignment arrangement 4 comprises a plate-shaped connecting element 5 for connection to the transmitter unit 2, a bearing element 6, which is also designed with a plate shape and which can be used for connection to further components, a retaining element 7 with a ball and socket joint, and three positioning members 8. The positioning members 8 each comprise a shape memory alloy that changes its shape at a change in temperature. In the shown embodiment, the positioning members 8 are designed in the form of pressure/tension rods. A change in the temperature causes a compression or expansion of the rods.

The connecting element 5 is pivotably connected to the bearing element 6 via the ball and socket joint and the positioning members 8. The alignment of the transmitter unit 2 can be changed by the positioning members 8 via the ball and socket joint. For this, the positioning members 8 can be individually, i.e., independent of one another, applied with current, which leads to a change in temperature of the positioning members and, thus, to the shape memory alloy. The illustrated embodiment makes a deflection of the transmitter unit 2 in every direction possible, whereby a particularly flexible detection of the surface of the bulk material is possible.

In this respect, the embodiment illustrated in FIG. 2 also demonstrates a robust device 1 for detecting a surface of bulk material, which simultaneously has a long service life.

Figure 3:
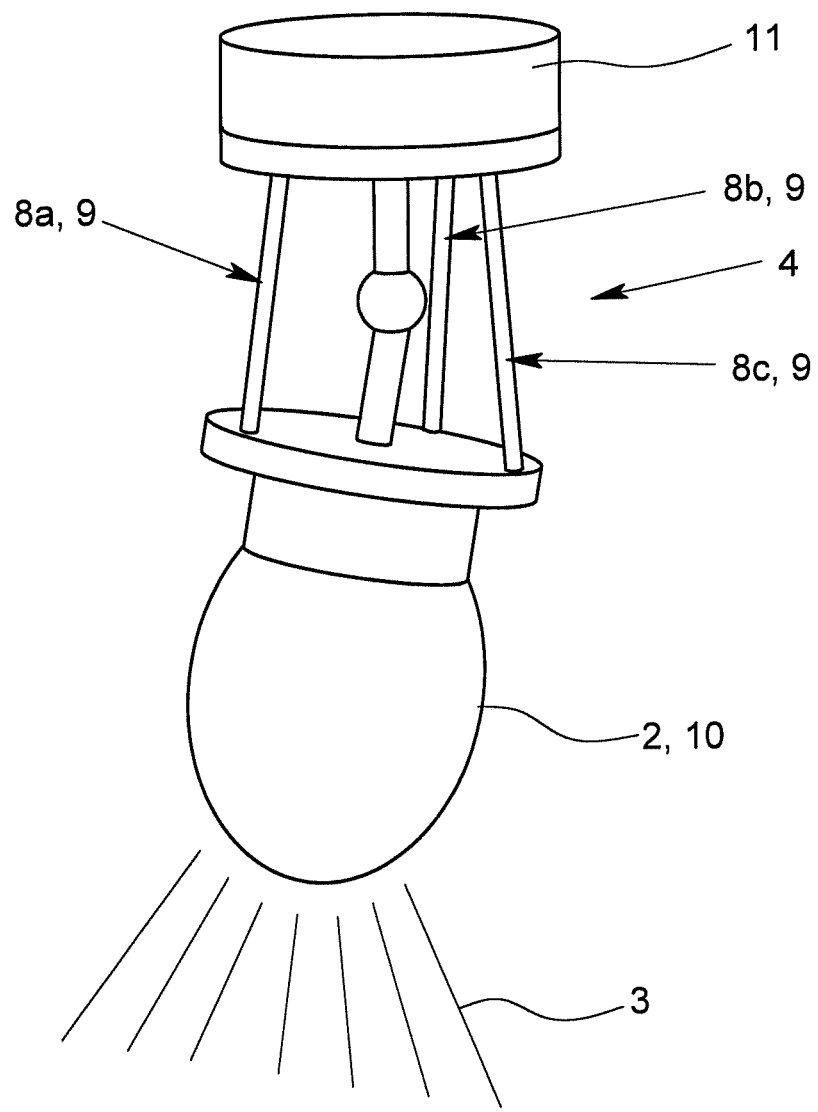
FIG. 3 is the second embodiment of the device according to the invention in the deflected state.

FIG. 3 shows the first embodiment of a device 1 according to the invention, wherein the transmitter unit 2 is deflected to the side by the positioning members 8 and the ball and socket joint. A positioning member 8a is compressed due to the supply of heat by an application of a current, while the other positioning members 8b, 8c are expanded or not influenced. The transmitter unit 2 is deflected by the change in shape of the positioning members 8, so that the radiation direction of the measuring signal 3 can be varied. In this manner, the surface of bulk materials can be completely detected.

What is claimed is:

1. A device for detecting a surface of a bulk material, the device comprising:
    a transmitter unit having a radiation direction for transmitting a measuring signal,
    a receiver unit for receiving a measuring signal reflected on the surface of the bulk material,
    a control and evaluation unit for controlling an alignment of the radiation direction and for evaluating the received measuring signal, and
    an alignment arrangement for aligning the transmitter unit,
    wherein the alignment arrangement comprises at least one connecting element for connection to the transmitter unit, at least one bearing element, and at least one positioning member,
    the connecting element is pivotably connected to the bearing element via the positioning member,
    an alignment of the transmitter unit is changeable by the positioning member, and
    the positioning member comprises a shape memory element that actively changes its shape under variations of an influencing parameter.

2. The device according to claim 1, wherein shape memory element comprises a shape memory alloy.

3. The device according to claim 1, wherein the shape memory element, according to a two way effect, actively takes one of two shapes based on a variation of the influencing parameter.

4. The device according to claim 1, wherein:
    the shape memory element, according to a one way effect, actively takes a base shape based on a variation of the influencing parameter, and
    a deflecting element is provided that is designed and arranged such that it deflects the shape memory element out of the base shape by exerting a force.

5. The device according to claim 1, wherein a movable retaining element is arranged between the connecting element and the bearing element.

6. The device according to claim 1, wherein:
    the alignment arrangement comprises at least three said positioning members,
    at least one of the at least three positioning members comprises a shape memory element, and
    the at least three positioning members are arranged such that the alignment of the transmitter unit is movable in all three spatial directions.

7. The device according to claim 1, wherein the at least one positioning member is designed in the form of a pressure/tension rod or in the form of a taut wire.

8. The device according to claim 1, wherein the influencing parameter for changing the shape of the shape memory element is one of temperature and magnetic field strength.

9. The device according to claim 1, wherein the influencing parameter for changing the shape of the shape memory element is temperature, and that the shape memory element is applied with a current by the control and evaluation unit for changing the temperature.

10. The device according to claim 1, wherein:
    the alignment arrangement comprises at least three said positioning members,
    the at least three positioning members each have a respective said shape memory element, and
    the influencing parameter for changing the shape of each respective said shape memory element can be independently varied.

11. The device according to claim 1, wherein:
the alignment arrangement comprises at least three said positioning members,
the at least three positioning members each have a respective said shape memory element, and
the influencing parameter for changing the shape of each respective said shape memory element can be varied in dependence on the influencing parameter for changing the shape of the other shape memory elements.

12. The device according to claim 5, wherein the retaining element comprises a joint.

13. The device according to claim 12, wherein the joint comprises a ball and socket joint.

14. The device according to claim 1, wherein at least one of the connecting element and the bearing element has a plate shape.

* * * * *